Nov. 20, 1962  T. H. COLLINS  3,064,935
SHUT-OFF VALVE FOR PIPE LINES
Filed May 23, 1960  2 Sheets-Sheet 2

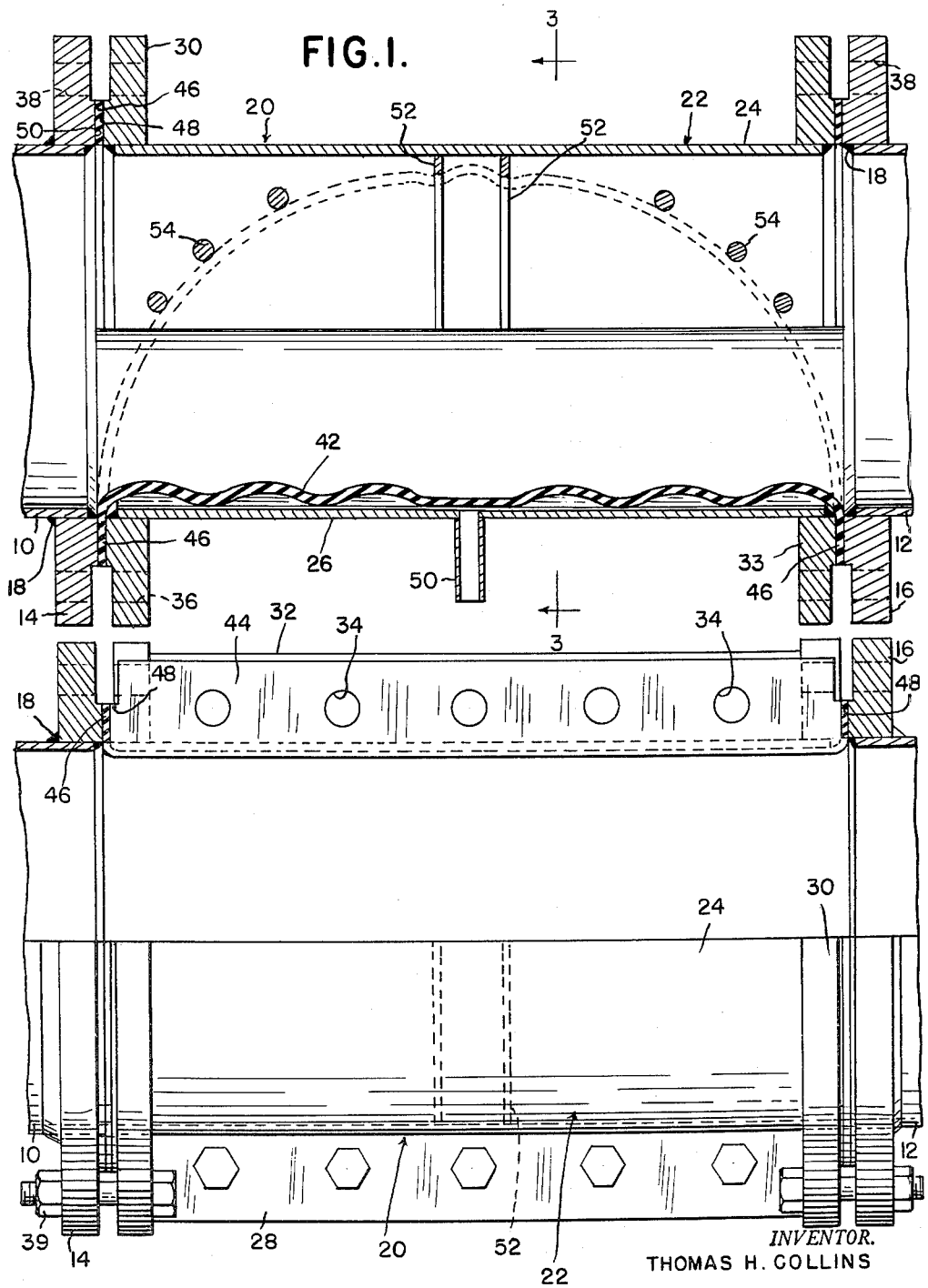

INVENTOR.
THOMAS H. COLLINS
BY
Whittemore, Hulbert
& Belknap
ATTORNEYS

United States Patent Office 3,064,935
Patented Nov. 20, 1962

3,064,935
SHUT-OFF VALVE FOR PIPE LINES
Thomas H. Collins, Highland, Mich., assignor to The Detroit Edison Company, Detroit, Mich., a corporation of New York
Filed May 23, 1960, Ser. No. 31,018
8 Claims. (Cl. 251—61)

This invention relates to a shut-off valve for pipe lines. More particularly, this invention relates to a fluid actuated shut-off valve which may be used in piping systems adapted to transport fluids such as gas or air, and even solid materials such as flour, sugar, coal, ash, etc.

The invention provides a fluid actuated diaphragm type of shut-off valve which is responsive to a fluid medium to terminate or cut off flow in the flow passage of the pipe or conduit. Shut-off valves currently in use have certain shortcomings including inadequate sealing across the flow passage after the valve has been closed which permits a small flow to continue through the conduit.

This invention overcomes the objection noted above by providing an improved diaphragm actuated shut-off valve which is simple in construction, economical, rugged in character and is readily applicable to existing piping systems to greatly enhance their efficiency and operation under all conditions.

It is an object of this invention to provide an improved diaphragm actuated valve.

Another object of this invention is to provide an improved diaphragm type of shut-off valve which is actuated by a fluid source which may take the form of a liquid or gas.

Still another object of this invention is to provide an improved shut-off valve which includes a novel type of diaphragm construction having a flexible wall or sleeve portion and sealing flanges integrally connected to the ends of the sleeve portion.

A further object of the invention is to provide an improved shut-off valve comprising a body having a flow passage therein, a diaphragm including a flexible sleeve positioned in a part of said passage and integrally connected sealing flanges on the end portions of the sleeve and means for holding said flanges and the longitudinal edge portions of said sleeve against displacement whereby the remaining portion of said sleeve is adapted to be expanded in a direction transverse to said flow passage to terminate flow therethrough.

A still further object of the invention is to provide an improved shut-off valve comprising a body having a flow passage therein, a diaphragm including a flexible semi-cylindrical sleeve positioned in a corresponding part of said passage and integrally connected sealing flanges on the ends of said sleeve, means for holding said flanges and the longitudinal edge portions of said sleeve against displacement, and fluid actuated means for expanding the remaining portion of said sleeve in a direction transverse to said flow passage to terminate flow therethrough.

Another object of the present invention is to provide an improved shut-off valve for use in a piping system comprising a body having a cylindrical straight-through flow passage therein, a diaphragm including a flexible semi-cylindrical sleeve positioned in a corresponding part of said passage and integrally connected sealing flanges on the ends of said sleeve for sealing the ends of said valve at the points of connection in the piping system, means for holding said flanges and the longitudinal edge portions of said sleeve against displacement whereby the remaining portion of said sleeve is adapted to be expanded in a direction transverse to said passage and moved completely across said flow passage to terminate flow therethrough.

Still another object of the present invention is to provide an improved shut-off valve for use in a piping system comprising a body having a cylindrical straight through flow passage therein, a diaphragm including a flexible semi-cylindrical sleeve positioned in a corresponding part of said passage and integrally connected sealing flanges on the ends of said sleeve for sealing the ends of said valve at the points of connection in the piping system, means for holding said flanges and the longitudinal edge portions of said sleeve against displacement and fluid actuated means for expanding the remaining portion of said sleeve so as to move said remaining portion completely across said flow passage to terminate flow therethrough.

A still further object of the invention is to provide a simple, economical and rugged diaphragm type of shut-off valve which is readily applicable to existing piping systems and which has certain advantages contributing to efficiency, reliability and long life under all conditions of operation as well as ease of maintenance.

Other objects and features of the invention will become apparent as the description proceeds, especially when taken in conjunction with the accompanying drawings, illustrating preferred embodiments of the invention, wherein:

FIGURE 1 is a sectional, elevational view taken substantially on the center line and showing the valve in cross section.

FIGURE 2 is a partial sectional view taken on line 2—2 of FIGURE 3.

Figure 3:
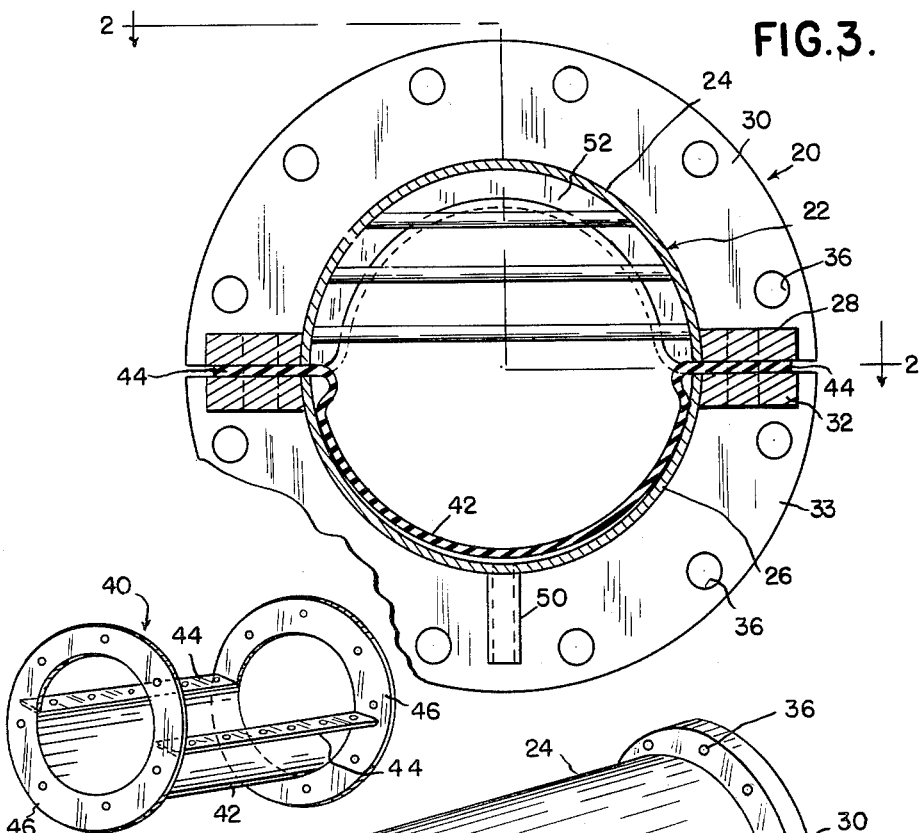
FIGURE 3 is a sectional view taken on line 3—3 of FIGURE 1.
Figure 5:
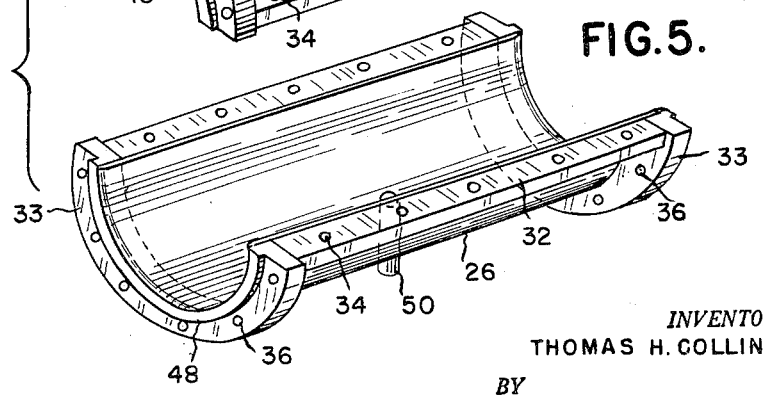
FIGURE 5 is an isometric view of the top and bottom body portions of the shut-off valve.

The shut-off valve to be hereinafter described is adapted to be inserted into piping systems which convey either fluids or solids. FIGURES 1 and 3 show part of a piping system which has branch passages 10 and 12 which have circumferential flanges 14 and 16 respectively. The flanges are secured to the pipe by welding or by other conventional means as indicated at 18. The shut-off valve is interposed between the flanges of the pipes and is designated by the numeral 20. A valve body 22 which is normally made in two pieces, including an upper half 24 and a lower half 26, is shown in FIGURE 5. The upper half 24 includes a semi-cylindrical portion which has a longitudinally extending flange 28 on both sides and a transverse circumferential flange 30 at each end. The upper half 24 is identical with the lower half 26 with the exception of a fluid connection which is included in the lower half 26 and will be explained herein later. The upper longitudinal flanges 28 have corresponding longitudinal flanges 32 provided on the lower half 26 and corresponding transverse circumferential flanges 33 which are adapted to match the flanges 30. The longitudinal flanges 28 and 32 have a plurality of matching holes 34 provided therein so that bolts may be inserted to join the halves 24 and 26 into an integral unit. The flanges 30 and 33 have holes 36 formed therein which are adapted to match the holes 38 provided in the circumferential pipe flanges 14 and 16. Fastening means extends through holes 36 and 38 for positioning the valve 20 in the piping system.

Figure 4:
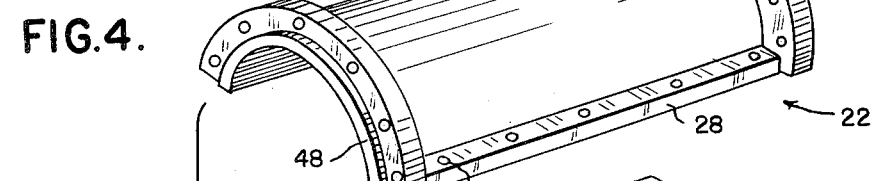
FIGURE 4 is a perspective view of the integral diaphragm seal construction.

The diaphragm unit, as shown in FIGURE 4, is designated by the numeral 40 and includes a flexible lower semi-cylindrical portion or wall 42 which has a pair of longitudinal extending flanges 44 and transverse circumferential sealing flanges 46 at the outer ends of the semi-cylindrical portion 42. The diaphragm construction may be made from rubber, neoprene or other compositions.

The sleeve portion or wall 42 is shown as made from corrugated material; however, it should be understood that it may be made from a flat and tight material which has ample elasticity to allow the sleeve to expand and properly close the pipe line. The thickness of the diaphragm would depend on the pressure required to close the valve. The sleeve portion 42 of the diaphragm unit 40 has a semi-cylindrical contour which is adapted to match the inside of the lower body portion 26.

The lower body portion 26 has a tubular connection 50 which connects the bottom portion of the diaphragm 40 with a fluid source such as a vacuum or hydraulic source. Where the valve is utilized in a combustible piping system, the fluid actuated medium may be water or an inert gas. Where the piping system is conveying a solid material such as flour, sugar, coal, ash, etc., the fluid actuated medium may be gas, water or oil, depending on the type of diaphragm installed. The fluid may be supplied by either plant service lines, portable tanks or even a hand pump mounted on the valve body.

The shut-off valve is assembled in the following manner. The diaphragm 40 is placed in the body 22 so that the flexible sleeve portion engages the lower body portion 26. The diaphragm seal flanges 46 engage the cylindrical boss 48 provided on the outer end of each of the flanges 33. The upper body portion 24 is placed on the lower body portion so that the holes 34 are in proper alignment. After the bolts or similar fastening means have been inserted in the holes 34, the valve 20 is ready for insertion into the piping system, as shown in FIGS. 1 and 3. The shut-off valve 20 is placed in the system so that the resilient sealing flanges 46 engage the boss 50 provided on the ends of the pipe flanges 14 and 16. Bolts 39 are then extended through the aligned holes 36 and 38 so as to fixedly locate the valve 20 in the piping system.

When the valve is in a non-operating position, the sleeve portion 42 of the diaphragm 40 is in close proximity to the inner periphery of the lower body portion 26 as is shown in FIG. 3. When it is desirable to terminate the flow through the piping system, the fluid actuating medium is supplied to the connector 50 so as to expand the flexible sleeve portion 42 in a direction transverse to the flow passage to close the passage.

In order to insure an appropriate seal, a pair of square-edged seat rings 52 are provided in the upper body portion 24 of the valve 20, as is shown in FIGS. 1, 2 and 3. A plurality of retainer bars 54 are positioned in the upper body portion 26 so as to limit the radial expansion of the wall or sleeve portion 42. The retainer bars 54 may be made from wire mesh or metal rods preformed to fit the expanded sleeve portion 26.

Referring again to FIG. 4, it will be observed that the longitudinal body flanges 28 and 32 hold the sleeve flanges 44 against displacement. In addition the end portions of the sleeve are integrally connected to the sealing flanges 46 which are in turn held against displacement. The remaining portion of the sleeve 42, which is not held against displacement, is adapted to flex or to expand so that the sleeve moves upwardly and across the cylindrical passage to terminate flow therethrough. An appropriate seal is obtained in the upper half through the arrangement of the seat rings 52.

Describing the construction in another way, the sleeve portion of the diaphragm 40 forms an envelope or fluid pocket with the lower body portion 26 of the valve 20 so that when the fluid operating medium is supplied to the connector 50, the unsecured sleeve portion expands in a direction transverse to the passage against the seat rings 52 closing the valve 20. The retainer bars 54 prevent blow-outs, which could occur when high operating pressures are utilized. To open the valve 20 it is only necessary to exhaust the operating medium and the line pressure returns the unsecured sleeve portion 42 to its original open position.

The drawings and the foregoing specification constitute a description of the shut-off valve for pipe lines in such full, clear, concise and exact terms as to enable any person skilled in the art to practice the invention, the scope of which is indicated by the appended claims.

What I claim as my invention is:

1. A shut-off valve comprising a tubular body having a cylindrical straight-through flow passage therein, an elongated valve element including a resilient semi-cylindrical wall positioned in said passage, a sealing ring radially located in said passage opposite said resilient wall, means for holding the end portions and the longitudinal portions of said semi-cylindrical wall against displacement, fluid means for expanding the remaining portion of said resilient wall in a direction transverse to said passage so as to firmly seat on said sealing ring thereby terminating flow through said passage, and retainer means extending transversely of said passage and located near the end portions of said wall so as to engage and support said end portions upon the expansion of said resilient wall, said retainer means including a plurality of bars transversely spaced in said passage.

2. A shut-off valve comprising a tubular body having a cylindrical straight-through flow passage therein, a resilient diaphragm, said diaphragm including an elongated semi-cylindrical sleeve positioned in said passage and annular sealing flanges integrally connected to the end portions of said sleeve, said flanges being adapted to engage the ends of said tubular body so as to prevent leakage at the points where the valve is interposed in a piping system, means for holding said flanges and the longitudinal edge portions of said sleeve against displacement, a sealing ring radially located in said passage opposite said sleeve, fluid means for expanding the remaining portion of said sleeve so as to engage said sealing ring thereby terminating the transmission of flow through said passage, and retainer means extending transversely of said passage and located near the end portions of said sleeve so as to engage and support said end portions upon the expansion of said sleeve, said retainer means including a plurality of bars transversely spaced in said passage.

3. A shut-off valve comprising a tubular body having a straight-through flow passage therein of circular cross section, an elongated resilient valve element of generally semi-circular cross section positioned in said passage and having open and closed positions, means connecting and sealing the entire periphery of said valve element to the inner surface of said body, inlet means in said tubular body for admitting a fluid under pressure into an expansible chamber defined by said body and said valve element so as to expand said valve element from said open position towards said closed position in a direction transverse to said passage to fill said passage and thus terminate flow through said passage, and retainer means at opposite ends of said body extending transversely of said passage and located entirely within said flow passage so as to engage and support the ends of said valve element upon the expansion of said valve element to the aforesaid closed position, said valve element when in said open position being separated from said retainer means.

4. A shut-off valve defined in claim 3 in which said retainer means comprise one or more transversely extending bars.

5. A shut-off valve defined in claim 4 in which said retainer means comprise a plurality of transversely extending bars which are spaced longitudinally and transversely apart in said body.

6. A shut-off valve comprising a tubular body having a straight-through flow passage therein of circular cross section, an elongated resilient valve element of generally semi-circular cross section positioned in said passage, means connecting and sealing the entire periphery of said valve element to the inner surface of said body, a seat for said valve element, said seat extending generally 180 degrees and connected to the inner surface of said tubular body directly opposite said valve element, inlet means in said tubular body for admitting a fluid under pressure into an expansible chamber defined by said body and said valve element so as to move said valve element from said open position towards said closed position in a direction transverse to said passage to firmly engage said seat throughout generally 180 degrees and completely fill said passage, thereby terminating flow through said passage, and retainer means at opposite ends of said body extending transversely of said passage and located entirely within said flow passage so as to engage and support the ends of said valve element upon the expansion of said valve element to the aforesaid closed position, said valve element when in said open position being separated from said retainer means.

7. A shut-off valve comprising a tubular housing constructed of two hollow semi-cylindrical sections flanged at the ends for mounting in a pipe line and flanged lengthwise at the two edges, a flexible valve sleeve of general semi-circular cross section having outwardly extending lengthwise flanges secured between the lengthwise flanges of said housing, the remaining portion of said sleeve lying generally against the interior wall of one of said semi-cylindrical sections, an arcuately shaped valve seat extending generally 180 degrees and secured to the interior wall of the other of said semi-cylindrical sections, inlet means in said one section for admitting a fluid under pressure into an expansible chamber defined by said one section and said sleeve so as to move said sleeve in a direction transverse to said passage into sealing engagement with said valve seat throughout generally 180 degrees and thus terminate flow through said passage, and a plurality of bars mounted in said other sections near the ends thereof, said bars extending transversely of said passage and limiting the expansion of said valve element upon application of fluid pressure to said chamber.

8. A shut-off valve comprising a tubular body having a straight-through flow passage therein of circular cross section, an elongated resilient valve element of generally semi-circular cross section positioned in said passage and having open and closed positions, means connecting and sealing the entire periphery of said valve element to the inner surface of said body, a seat for said valve element, said seat extending generally 180 degrees and connected to the inner surface of said tubular body directly opposite said valve element, inlet means in said tubular body for admitting a fluid under pressure into an expansible chamber defined by said body and said valve element so as to move said valve element from said open position towards said closed position in a direction transverse to said passage to firmly engage said seat throughout generally 180 degrees and completely fill said passage, thereby terminating flow through said passage, and retainer means at opposite ends of said body extending transversely of said passage and located entirely within said flow passage so as to engage and support the ends of said valve element upon the expansion of said valve element to the aforesaid closed position, said valve element when in said open position being separated from said retainer means, said retainer means comprising a plurality of transversely extending bars which are spaced longitudinally and transversely apart in said body.

References Cited in the file of this patent
UNITED STATES PATENTS

| | | |
|---|---|---|
| 1,855,991 | Saunders | Apr. 26, 1932 |
| 1,873,138 | Mitchell | Aug. 23, 1932 |
| 2,573,712 | Kallam | Nov. 6, 1951 |
| 2,598,207 | Bailey | May 27, 1952 |
| 2,828,101 | Antram | Mar. 25, 1958 |
| 2,898,078 | Stephenson | Aug. 4, 1959 |
| 3,022,977 | Jones | Feb. 27, 1962 |